United States Patent [19]
Veltman

[11] 3,766,034
[45] Oct. 16, 1973

[54] REMOVAL OF IONS FROM LIQUIDS

[75] Inventor: Preston Leonard Veltman, Severna Park, Md.

[73] Assignee: W. R. Grace & Co., New York, N.Y.

[22] Filed: Aug. 1, 1972

[21] Appl. No.: 277,008

[52] U.S. Cl.............. 204/149, 204/284, 204/290, 204/180 P, 204/152, 204/130
[51] Int. Cl........................... C02b 1/82, C02c 5/12
[58] Field of Search.................. 204/149, 152, 130, 204/284, 180 B, 180 P, 290

[56] References Cited
UNITED STATES PATENTS

| | | | |
|---|---|---|---|
| 2,812,300 | 11/1957 | Pearson | 204/151 |
| 3,149,061 | 9/1964 | Parsi | 204/180 B |
| 3,457,152 | 7/1969 | Maloney, Jr. et al. | 204/130 X |
| 3,485,737 | 12/1969 | Kakihana et al. | 204/180 R |
| 3,644,146 | 2/1972 | Bergum | 204/130 X |
| 3,692,661 | 9/1972 | Shockcor | 204/149 X |
| 3,716,459 | 2/1973 | Salter et al. | 204/1 R |

Primary Examiner—John H. Mack
Assistant Examiner—A. C. Prescott
Attorney—Arthur P. Savage et al.

[57] ABSTRACT

An electrolytic process for removing ionic substances from liquids wherein the liquid is contacted with a bed of reactive electrode particles. The electrode particles comprise a compound which will react with the ionic substance to be removed and may be coated with an ion-permeable membrane. The process finds particular utility in the removal of impurities from water.

11 Claims, 3 Drawing Figures

REMOVAL OF IONS FROM LIQUIDS

The present invention relates to the removal of ionic substances from water, and more specifically to an apparatus and method for effectively and efficiently removing ionic impurities from water.

It is generally known that low concentrations of ionic impurities such as sulfate, phosphate and chloride may be removed from water by electrolysis and/or ion exchange techniques. In recent years, electrolytic purification procedures have been developed which employ ion-permeable membranes. These procedures have been found to be relatively slow and inefficient due to the fact ions which are to be separated from the liquid must generally migrate considerable distances before separation occurs.

More recently, it has been shown that the efficiency of ionic separation procedures may be enhanced by the use of relatively finely divided carbon electrode beds such as shown in U. S. Pat. No. 3,616,356. The use of such particulate beds or electrode packing, which generally comprises elongated carbon granules having a size of at least 1 × 1 mm, provides an electrolytic cell which contains a multitude of electrode surfaces upon which ion impurities may be deposited. The capacity of such particulate carbon electrode beds is generally limited, and frequent replacement and/or regeneration of the bed is required when any substantial quantity of impurity is to be removed.

It is therefore an object of the present invention to provide an improved electrolytic procedure for removing impurities from liquids.

It is a further object to provide an improved electrode packing for use in electrolytic separation processes which employ particulate electrode packings.

It is still a further object to provide particulate electrode beds which possess an extremely high capacity for the removal of ionic substances from water.

It is yet a further object to provide a cheap, efficient method for removing low concentrations of phosphate and/or sulfate impurities from water.

These and still further objects of the present invention will become readily apparent to one skilled in the art from the following detailed description and drawings wherein.

Broadly, my invention contemplates a method for removing ionizable impurities in liquids wherein the liquid is contacted with reactive electrode particles, which are coated with an ion-permeable membrane, under electrochemical reaction conditions.

More specifically, I have found that ionizable impurities present in a liquid such as water may be rapidly and efficiently removed, and recovered if desired, by subjecting the liquid to electrolysis conditions in the presence of particulate electrodes which comprise a substance which is reactive with the ionized impurities and which is coated with an ion-permeable mmbrane.

Typically, my process may be used to remove phosphate or sulfate impurities from water. In such a process, my ion-permeable membrane coated reactive electrode particles possess a core of aluminum and lead respectively. Under electrolysis conditions it is found that in the case of phosphate, the phosphate ions migrate through the ion-permeable membrane and subsequently react with aluminum to form insoluble aluminum phosphate compounds. In the case of sulfate removal, a lead electrode covered with the ion-permeable membrane is utilized under electrolysis conditions, wherein the sulfate ions pass through the ion-permeable membrane and react with lead to form lead sulfate. The electrolysis reaction takes place until substantially all of the reactive compound within the electrode particles is utilized whereupon the particles may be removed from the electrolysis device and the compounds be covered for subsequent use.

Figure 1:
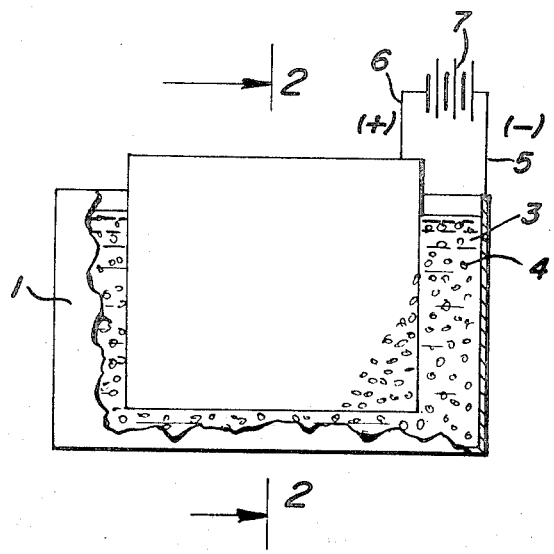
FIG. 1 is a plane side view, with parts broken away, of an electrolytic cell used in the practice of the present invention.

A more clear understanding of my invention may be obtained by reference to FIG. 1, which represents a typical electrolysis cell such as disclosed in U. S. Pat. No. 3,616,358, which may be utilized in the practice of the present invention. In FIG. 1, a electrolysis cell case 1 contains a center plate electrode 2 and is filled with electrolyte 3. Also contained within the case 1 is particulate electrode packing 4 which fills the space between the case walls 1 and the center electrode 2.

Attached to the electrolytic cell case walls 1 is an electrical conductor 5 which conducts current to the case walls 1 which are constructed of electrically conductive material. As shown in FIG. 1, the case 1 is negatively charged and, therefore, serves as the cathode in the operation of this particular device. Attached to the center electrode 2 is electrical conductor 6 which conducts current to the center electrode. As indicated in FIG. 1, the center electrode is positively charged and serves as the anode in the operation of the present cell.

Current required for the operation of the cell shown in FIG. 1 is provided for by current source 7 which represents a source of direct current which may be provided by a simple battery or rectifier device.

Figure 2:
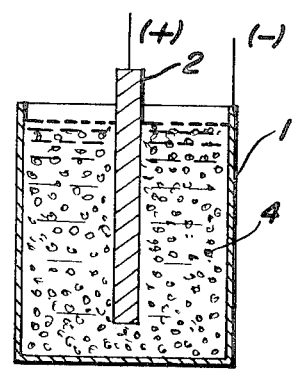
FIG. 2 is a cross-sectional view of the cell of FIG. 1 taken through the line A—A.

FIG. 2 is a cross-sectional view of FIG. 1 taken through line A—A. It is noted that the electrode packing 4 substantially fills the space between the anode 2 and the case wall cathode 1.

Figure 3:
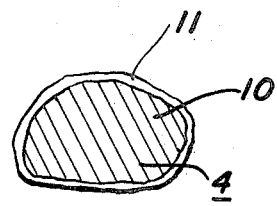
FIG. 3 is a cross-sectional view of a reactive electrode particle used in the cell shown in FIGS. 1 and 2.

The electrode particles 4 as shown in FIG. 3 comprise a reactive composition core 10 which is coated by an ion-permeable membrane 11. The reactive core 10 may comprise a metal such as aluminum or lead, which is capable of forming insoluble compounds with the ions removed from the liquid being processed in the cell. The ion-permeable membrane layer 11 comprises any suitable ion-permeable membrane material known to those skilled in the art. Typically, ion-permeable membrane 11 may be prepared from a phenol-resorcinol-formaldehyde reaction mixture or from a polyurethane-polymer composition. Preferably, the ion-permeable membrane layer will possess a thickness on the order of from about 1/10 to 5 mils. The inner reactive core 10, which forms the bulk of the electrode particle, will possess a preferred cross-section diameter on the order of 1 mm. Preferably, the electrode particle will be elongated and possess a length of greater than 1 mm when the cross-section measurement is on the order of 1 mm. A typical preferred electrode particle will possess a length of from about 2 to 4 mm, a width as shown horizontally in FIG. 3 of at least 1 mm, and a height as vertically in FIG. 3 of at least 1 mm.

In operation, the electrolytic cell case 1 is first filled with electrode particles 4. The electrode particle will consist of a reactive material suitable for reaction with the specific impurity which is to be removed from the fluid placed in the cell. For purposes of the present description, we will describe the typical operation of the cell in an instance wherein water, containing approximately 5 percent by weight phosphate, is treated. In this instance, the packing of electrode particles comprises aluminum granules coated with a polyurethane membrane approximately 1 mil. thick. The cell, which is filled with the electrode particles 4, is then filled with the liquid to be treated and indicated as electrolyte 3 in FIG. 1. The current is then applied to the conductors 5 and 6 at a voltage of approximately one to two volts. The cell is permitted to operate until the current requirement decreases, which indicates substantially all of the ionic phosphate has been removed from the water.

In commercial operation, conduit means (not shown) may be supplied to continuously admit and remove water from the cell. The specific rate of flow through the cell will depend upon the concentration of the ionic impurities present in the water and the degree of purification required. Generally, it is found that when the cell is operating at temperatures of from about 20° to 35° centigrade, a voltage of from about one to three volts is required to remove phosphate, sulfate and chloride impurities.

Having described the basic aspects of my present invention, the following examples are given to illustrate specific embodiments thereof.

EXAMPLE I

A particulate electrode packing material was prepared as follows: Granular aluminum pellets, which possess a cross-sectional diameter on the order of about 1 mm and an average length of approximately 3 mm were immersed in a solution consisting of polyethylene oxide terminated by isocyanate groups. Excess resin solution was permitted to drain from the pellets and the pellets were then immersed in water which caused the polymer to cross-link and foam. The dried pellets were then further cured at a temperature of about 100° C for approximately 1 hour. It was found that the pellets were uniformly coated with an ion permeable polyurethane resin at a thickness of approximately 1 to 5 mils thick.

EXAMPLE II

An electrolytic cell similar to that shown in FIG. 1, having a cross-sectional dimension of approximately 6 × 6 inches and a length of about 12 inches was fabricated from stainless steel plate. A center electrode, also fabricated of stainless steel plate was placed vertically in the center of the electrolytic cell approximately 1 inch from the bottom thereof. The cell was then filled with the dried pellets prepared by way of Example I. A source of rectified AC current was connected to the center electrode, which served as the anode, and the case wall, which served as the cathode. The cell was then filled with an aqeous solution which contained 5% by weight phosphoric acid. The voltage between the anode and cathode was maintained at approximately 1.7 volts for a period of approximately 120 minutes. It was noted that after this period the current requirement substantially decreased. The aqeous electrolyte was then analyzed for phosphate ion wherein it was found that approximately 90+ percent of the phosphate had been removed. Examination of the electrode pellets revealed that beneath the polyurethane resin layer, a layer of aluminum phosphate had formed.

EXAMPLE III

The procedures of Example I and II were repeated, however, electrode particles were prepared using granular lead pellets, which were coated with a phenol-resorcinol-formaldehyde resin at a thickness of approximately 1 mil. It was found that a cell which contained these electrode particles is very effective for removing sulfate ion from water present in amounts ranging up to 5% by weight.

The above examples clearly indicate that my present invention provides a useful, efficient method for removing ionic impurities from liquids.

I claim:

1. A method for removing ionic impurities from a liquid which comprises:
    a. subjecting a liquid which contains ionic impurities to electrolysis conditions in the presence of particulate reactive electrodes, said electrodes being coated with an ion-permeable
    b. recovering said liquid after ionic impurities therein have reacted with said electrodes to form substantially non-soluble compounds therewith.

2. The method of claim 1 wherein said liquid is water.

3. The method of claim 1 wherein said impurities are selected from the group consisting of phosphate, sulfate and chloride ions.

4. The method of claim 1 wherein said impurities are phosphate ions and said electrodes are aluminum metal particles coated with an ion-permeable membrane.

5. The method of claim 1 wherein said particulate electrodes are lead metal coated with an ion-permeable membrane and said impurities include sulfate ion.

6. The method of claim 1 wherein said particles are coated with a hydrophilic-polymer selected from the group consisting of polyurethanes and phenol-resorcinol-formaldehyde reaction products.

7. The method of claim 1 wherein said particulate electrodes are elongated and possess a cross-sectional diameter of at least 1 mm.

8. A particulate electrolytic apparatus which comprises:
    a. an electrolytic cell having a spaced anode and cathode surface;
    b. particulate reactive electrodes coated with an ion-permeable membrane placed between said anode and cathode surfaces; and
    c. means for impressing a direct current potential between said electrodes.

9. The apparatus of claim 1 wherein said electrodes comprise aluminum particles coated with an ion-permeable membrane.

10. The apparatus of claim 8 wherein said particulate electrodes comprise lead particles coated with an ion-permeable membrane.

11. The apparatus of claim 8 wherein said electrodes possess a length greater than their diameter and the cross-sectional diameter thereof is at least 1 mm.

* * * * *

UNITED STATES PATENT OFFICE
CERTIFICATE OF CORRECTION

Patent No. 3,766,034  Dated October 16, 1973

Inventor(s) Preston Leonard Veltman

It is certified that error appears in the above-identified patent and that said Letters Patent are hereby corrected as shown below:

In Column 4, Claim 1, line 25:

"coated with an ion-permeable"

should read:

"coated with an ion-permeable membrane; and"

Signed and sealed this 12th day of March 1974.

(SEAL)
Attest:

EDWARD M. FLETCHER, JR.
Attesting Officer

C. MARSHALL DANN
Commissioner of Patents